Aug. 8, 1939.   J. M. BELL   2,168,386
VISCOSIMETER
Filed Aug. 11, 1936   8 Sheets-Sheet 3
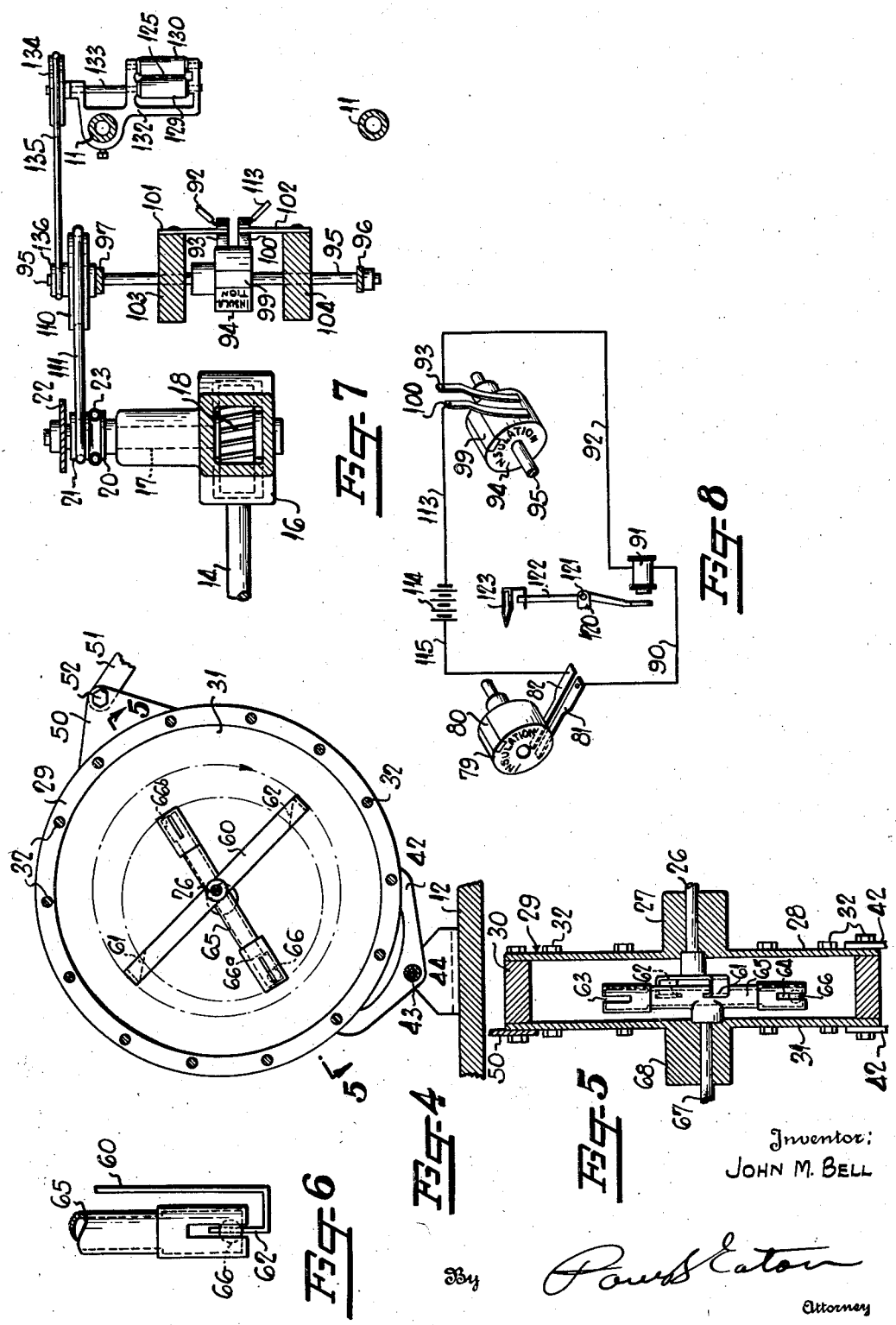
Inventor:
JOHN M. BELL
By Powell Eaton
Attorney

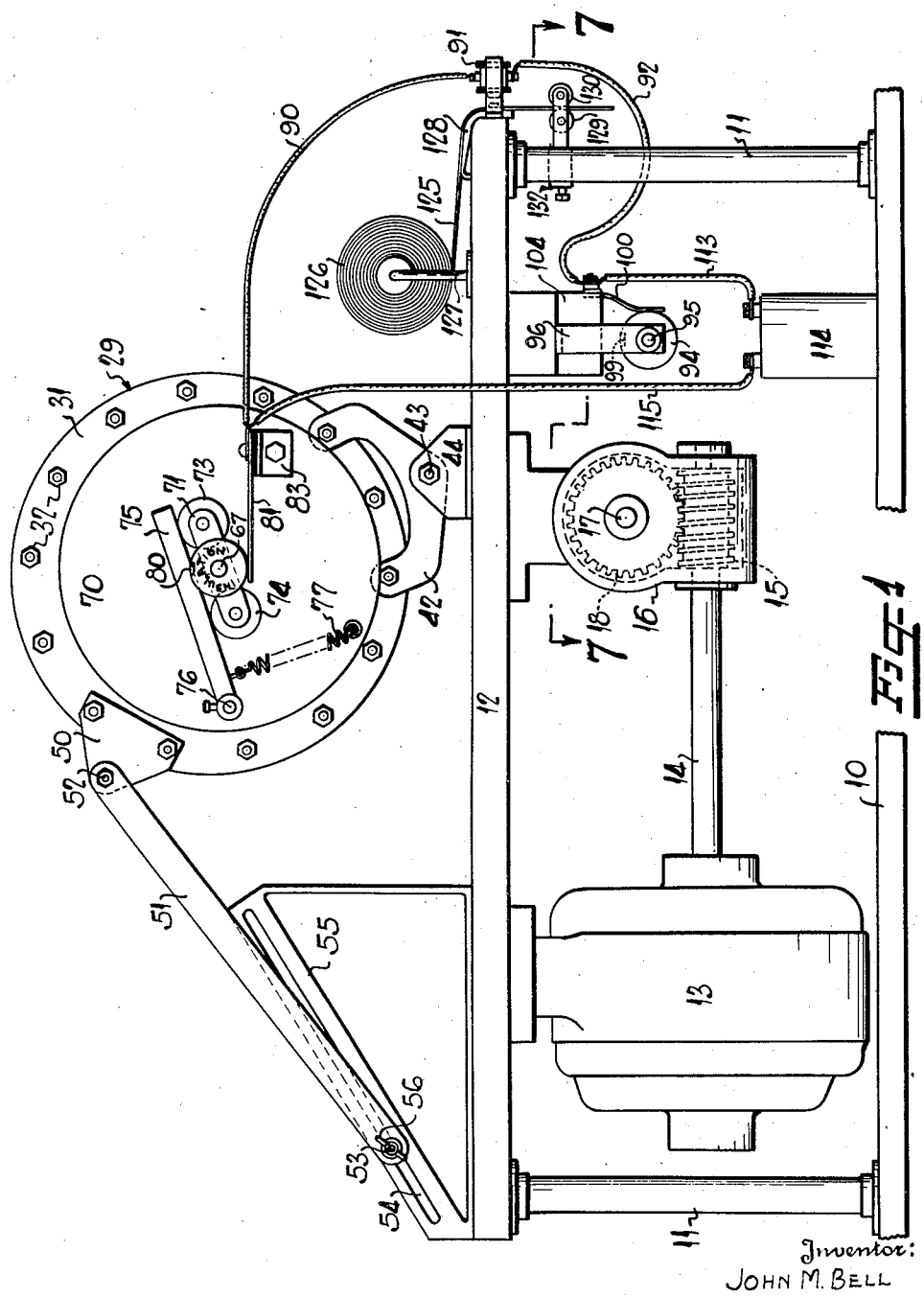

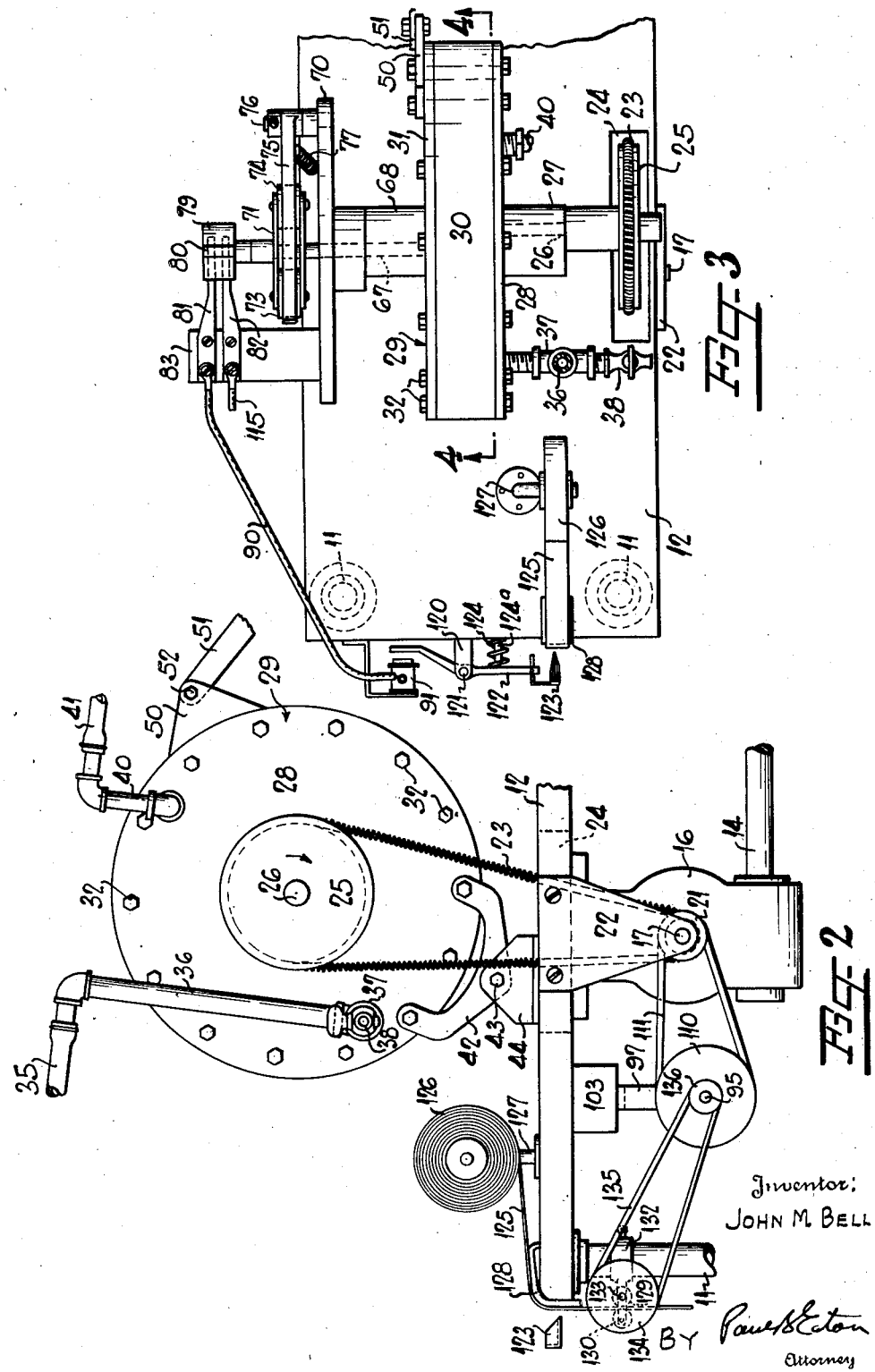

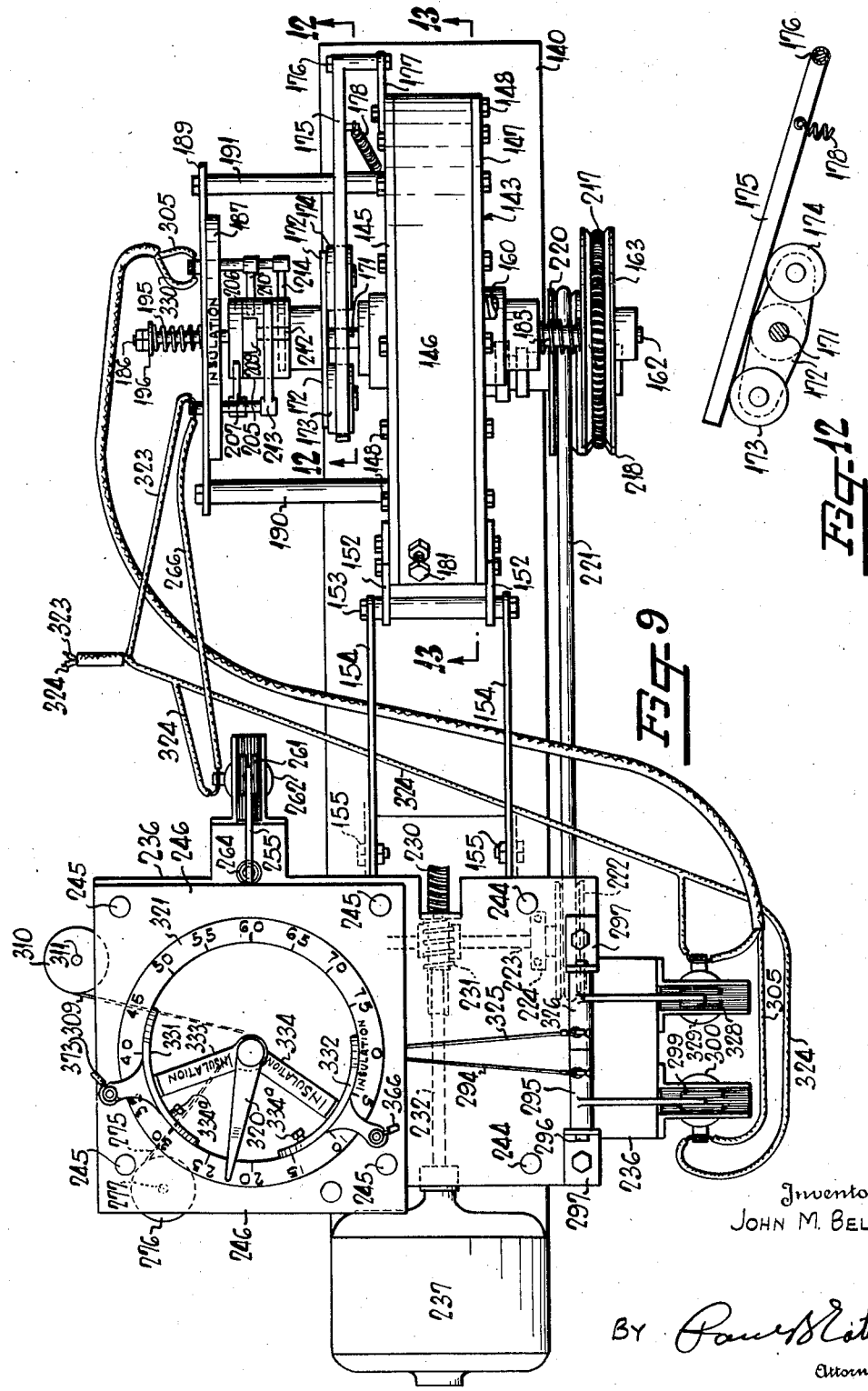

Aug. 8, 1939.　　　　J. M. BELL　　　　2,168,386
VISCOSIMETER
Filed Aug. 11, 1936　　　　8 Sheets-Sheet 5

Inventor:
JOHN M. BELL

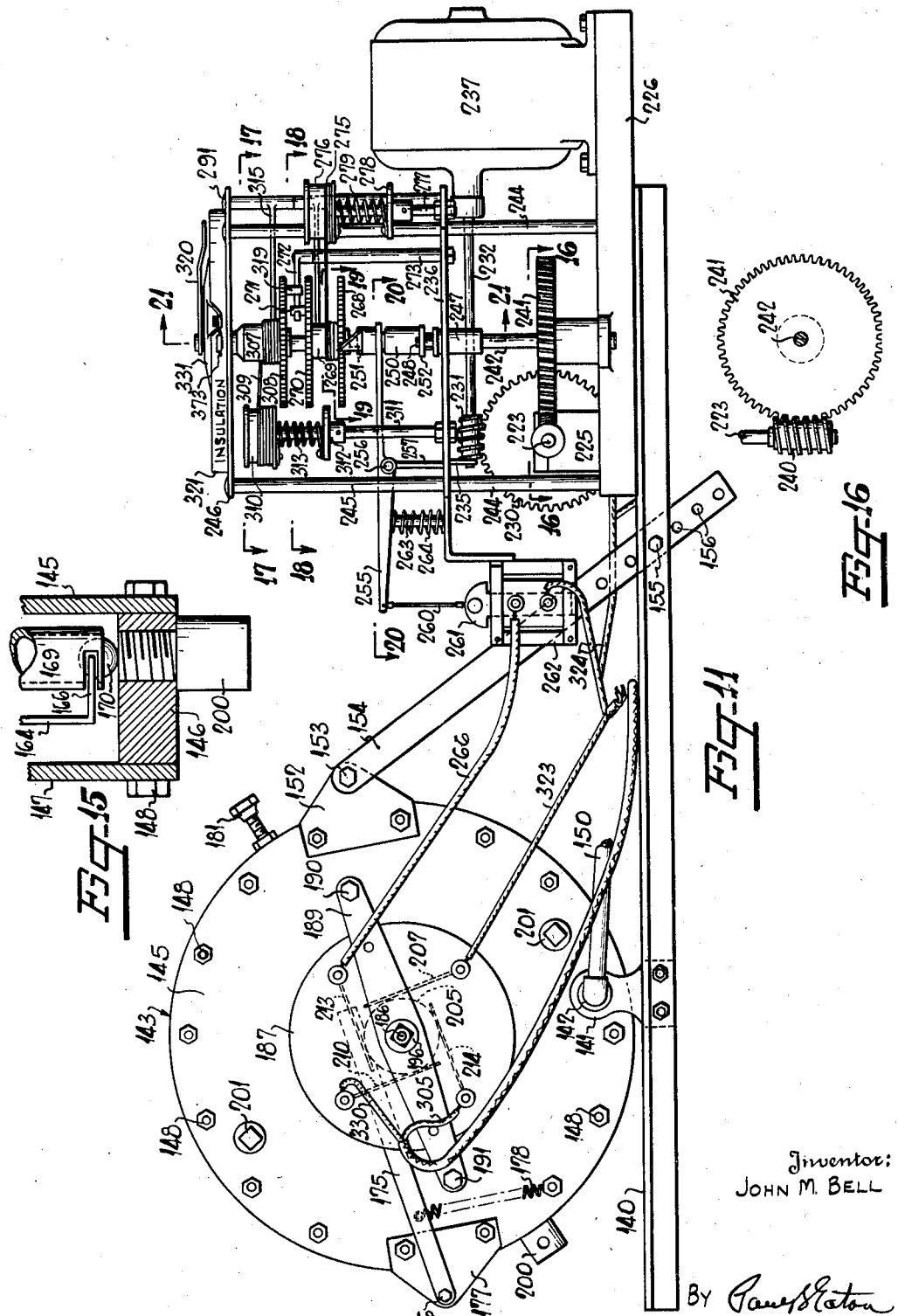

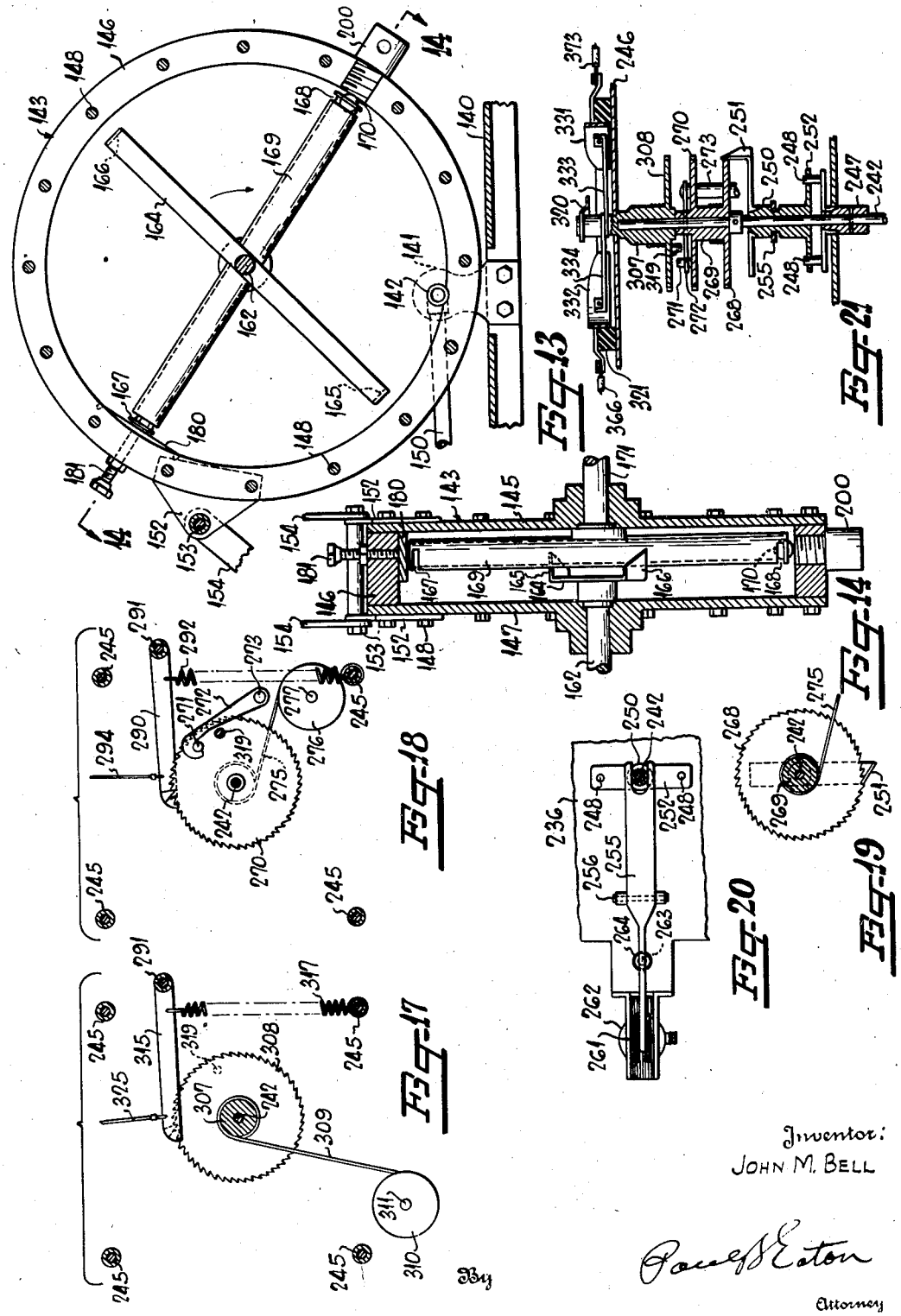

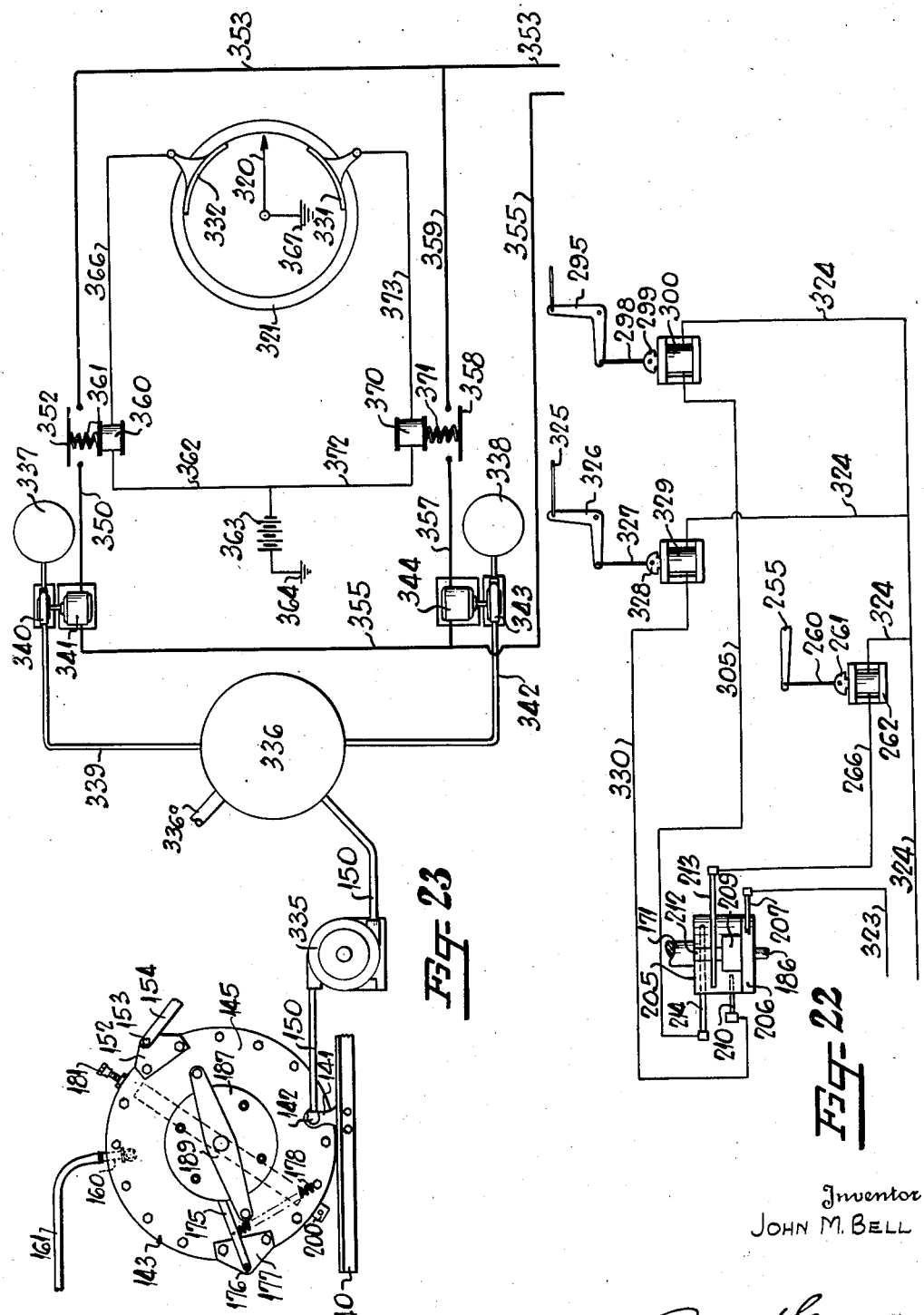

Patented Aug. 8, 1939

2,168,386

UNITED STATES PATENT OFFICE 2,168,386

VISCOSIMETER

John M. Bell, Chester, S. C.

Application August 11, 1936, Serial No. 95,444

4 Claims. (Cl. 265—11)

This invention relates to a means for testing viscous substances such as oils, starches, sizing, coating compositions, drugs and the like, and more especially to means for testing these substances while the same is under a constant flow.

Heretofore various means for testing the viscosity of substances have been provided but I have provided means whereby a viscosity testing apparatus can be installed in a line carrying the substances for testing the same without materially obstructing the flow. In many instances, while under manufacture, it is very essential that a constant check be kept upon the viscosity so that a uniform finished product can be obtained. To accomplish this result, in most instances, it is necessary to test the same with apparatus which requires a good bit of human skill and experience. The present apparatus eliminates to a great extent the human element and provides means which are purely mechanical for determining and registering the viscosity, thereby insuring uniform and accurate results.

It is therefore, an object of this invention to provide means for testing the viscosity of a substance which means is capable of being installed in series or are parallel in a pipe line through which the substance to be tested flows, and means for registering and recording the viscosity count of the substance.

It is another object of this invention to provide a mechanical means for testing the viscosity of a substance while under flow, with means for visibly indicating the viscosity count of said substance.

Some of the objects of the invention having been stated, other objects will appear as the description proceeds, when taken in connection with the accompanying drawings, in which:—

Figure 1 is a side elevation of one form of the invention;

Figure 2 is a side elevation of a portion of the reverse side of Figure 1;

Figure 3 is a plan view of Figure 2;

Figure 4 is a vertical sectional view taken along line 4—4 in Figure 3;

Figure 5 is a sectional view taken along line 5—5 in Figure 4;

Figure 6 is an enlarged detail view of the lower portion of the testing means in Figure 5 showing the parts in a slightly different position;

Figure 7 is a sectional plan view taken along line 7—7 in Figure 1;

Figure 8 is a schematic wiring diagram of the apparatus;

Figure 9 is a plan view showing a modified form of the invention;

Figure 11 is an elevation of the reverse side of Figure 10;

Figure 12 is a vertical sectional view taken along line 12—12 in Figure 9;

Figure 13 is a vertical sectional view taken along line 13—13 in Figure 9;

Figure 14 is a sectional view taken along line 14—14 in Figure 13;

Figure 15 is an enlarged detail view of the lower portion of Figure 14 with the parts shown in a slightly different position;

Figure 16 is a sectional plan view taken along line 16—16 in Figure 11;

Figure 17 is a sectional plan view taken along line 17—17 in Figure 11;

Figure 18 is a sectional plan view taken along line 18—18 in Figure 11;

Figure 19 is a sectional plan view taken along line 19—19 in Figure 11;

Figure 20 is a sectional plan view taken along line 20—20 in Figure 11;

Figure 21 is a vertical sectional view taken along line 21—21 in Figure 11;

Figure 22 is a schematic wiring diagram showing the means for regulating and operating the viscosity indicating and regulating means;

Figure 23 is a schematic diagram showing the invention operating in conjunction with a system and also showing the necessary wiring connected with the indicating means for controlling the viscosity of the substance within certain ranges.

Figure 10:
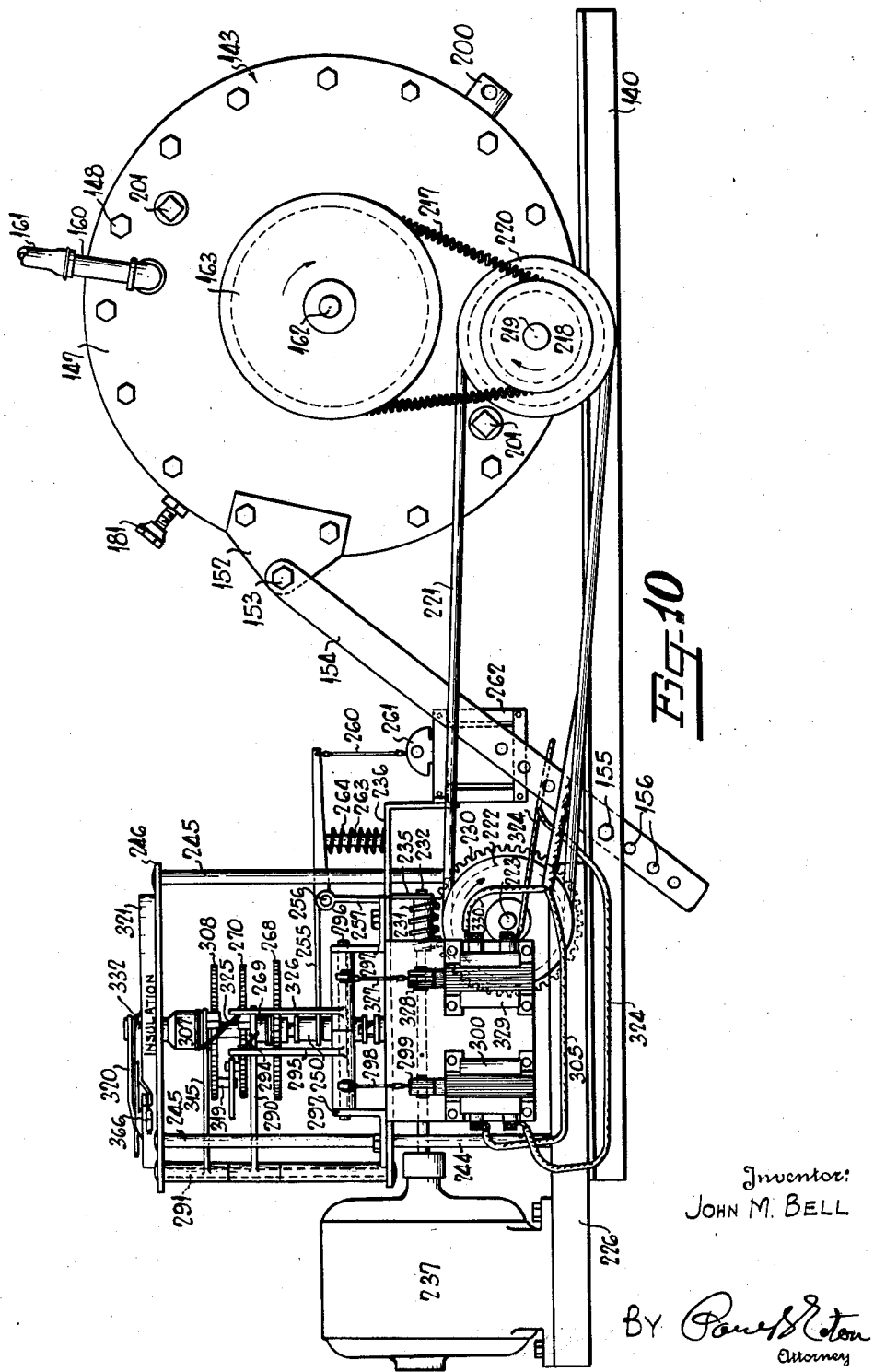
Figure 10 is a side elevation of Figure 9, looking at the lower side of Figure 9.

Referring more specifically to the drawings, the numeral 10 indicates a suitable base member upon which supports 11 are mounted, the upper end of said supports having a plane supporting member 12 secured thereon. Suspended from the lower side of member 12 is a motor 13 having a motor shaft 14, which shaft has a worm 15 mounted on the end thereof. One end of motor shaft 14 is rotatably mounted in housing 16 which housing is also secured to the lower side of the member 12. Housing 16 has a transversely disposed shaft 17 rotatably mounted therein and this shaft has fixedly secured thereto a pinion 18 which is adapted to mesh with worm 15 at all times.

Fixedly secured on shaft 17 are grooved pulleys 20 and 21 (Figs. 2 and 7), which are used for driving suitable mechanism, to be later described. The end of the shaft 17 is rotatably mounted in a plate 22 which, in turn, is secured to the member 12.

Mounted on grooved pulley 20 is a coil spring belt 23 which projects upwardly through a slot 24 in member 12 and is also mounted upon another grooved pulley 25. Pulley 25 is fixedly secured upon a shaft 26 which is rotatably mounted in a hub member 27 of cover 28. The cover 28 forms a part of a test chamber which is broadly indicated by reference characters 29. The test chamber 29 comprises the cover 28, an annular member 30 and another cover member 31 which is similar in many respects to cover member 28. These three members are secured together by suitable means such as bolts 32 which penetrate all three members. The substance to be tested is adapted to enter the chamber 29 through hose 35 and thence downwardly into pipe 36 which pipe has the lower end thereof connected to a T-member 37, one end of said T-member communicating with the inside of the chamber and the other end having a suitable petcock 38 (Fig. 3), secured thereon in order that portions of the substance may be withdrawn from the chamber or from the pipe line through which it is constantly flowing as desired. The substance is adapted to escape from the chamber through pipe 40 which has secured to the end thereof a hose 41. The object in providing hose members 35 and 41 is to have a flexible connection in the pipe line so that the angularity of the chamber may be varied more easily.

It will be noted by referring to Figures 1, 2 and 4, that the lower portion of chamber 29 has secured thereto suitable plate brackets 42 which are pivotally secured as at 43 to other brackets 44, said other brackets being mounted on the top of member 12.

In order to maintain the chamber in an adjusted position, a plate 50 is secured to the upper portion of chamber 29, and a link 51 is pivoted as at 52 to the plate. The lower end of link 51 has a bolt 53 penetrating a hole in the end thereof which bolt also penetrates a suitable slot 54 in a bracket member 55. When the chamber 29 has been placed at the desired angle relative to the pivot point 43, a wing nut 56 which is threadably secured on the end of bolt 53, is screwed home and the parts are clamped in the desired position.

When motor 13 is in operation the shaft 26 will revolve constantly in a clockwise direction in Figures 2 and 4. This shaft extends to the interior of chamber 29 and has fixedly secured on the end thereof a double-ended finger member 60, which member has reversely bent prongs 61 and 62 on its ends.

As shaft 26 rotates, the prongs 61 and 62 are adapted to pass through slots 63 and 64 in the hollow testing tube 65. The ends of this tube are partially closed and a suitable ball 66 is confined therein. This tube 65 is fixedly secured upon another shaft 67 which shaft is rotatably mounted in hub member 68 of the cover 31. The hub 68 has secured thereto a disk 70 which is stationary and serves as a support for various mechanisms which will be presently described. The shaft 67 also has fixedly mounted thereon a bracket 71 (Figs. 1 and 3), in which are rotatably mounted rollers 73 and 74. A bar 75 is pivoted as at 76 to the disk 70 and its free end normally rests on the top of the rollers 73 and 74 to hold them in the position shown in Figure 1, or else in a position when shaft 67 is rotated 180 degrees from the position shown in Figure 1.

In order to exert the desired pressure of bar 75 upon the rollers 73 and 74 a tension spring 77 is provided.

Fixedly secured on the end of shaft 67 is a wheel 79 which is made of any suitable insulating material. A metallic bar 80 is mounted in the periphery of the wheel 79 and this bar is disposed parallel to the longitudinal axis of the wheel in order that contact may be made between brushes 81 and 82 at the proper time. These brushes are fixedly secured to a bracket 83, which, in turn, is mounted on disk 70.

It should be understood that the substance which is being tested is constantly flowing into chamber 29 through hose 35 and leaving this chamber through hose 41.

The hollow pipe member 65, when at rest, maintains a position such as shown in Figure 4, or in the position where the ends are turned end for end or at 180 degrees from this position. When it is desired to test the viscosity of the substance which completely fills and is constantly flowing through this chamber the motor 13 is put into operation thereby causing the member 60 to rotate in a clockwise manner, in Figure 4, at any desired speed but preferably between thirty and forty R. P. M. When this is done the reversely bent prongs 61 and 62 will pass through slots 63 and 64 in member 65. When one of these prongs engages the ball 66, after the ball has reached the lower end of this member, the member 65 is turned end for end or 180 degrees from the position shown in Figure 4, at which time the shaft 67, to which this member is secured, is also rotated 180 degrees and the bar 75 is caused to rest on the reverse side of the rollers 73 and 74 to hold the shaft in the proper position. At the same time the wheel 79 is rotated 180 degrees, which will place the metallic bar 80 in contact with brushes 81 and 82. Brushes 81 and 82 close the circuit to the counting mechanism every other time the ball 66 is descending in the tube 65. This count is registered by a mechanism which will be presently described.

When the ball reaches the lower end of the tube, one of the prongs 61 or 62 again engages it and turns the member 65 and the shaft 67 one-half turn as before, which will position the metallic bar 80 on the upper side of wheel 79 to break the circuit and stop the counting mechanism.

During the succeeding descent of the ball, that is, when the metallic bar 80 is on top of the wheel 79, the counting mechanism is inoperative. It is therefore, seen that the viscosity is taken on every other descent of the ball 66.

It should be noted that the shafts 26 and 67 are disposed slightly off center relative to the center of the test chamber. This is done in order to allow the prongs 61 or 62 to become disengaged from the ball 66 by the time the pipe 65 has been rotated approximately 180 degrees. Figure 4 shows the path of rotation of the ends of the respective members and it is here seen that when the ball 66 has been rotated nearly 180 degrees from the position shown in this figure, that the reversely bent point 61 or 62 which happens to be in engagement with the ball 66 will automatically be released from the ball to allow the ball to start its descent. It is further seen by referring to Figure 4 that the ends of the bore within the member 65 have stepped portions or notches 66a and 66b. These cut-away portions or notches are formed in order to give the ball 66 an added velocity or drop when it nears the completion of its downward travel so that the travel of the ball will be faster and will quickly obstruct the path of travel of the projections 61 and 62.

The brush 81 has connected thereto a wire 90 which leads to one side of a magnet 91. The other side of the magnet has a wire 92 (Fig. 8) leading therefrom which is also connected to a brush 93, said brush 93 normally contacting a wheel 94 which is fixedly secured on a shaft 95. Shaft 95 is rotatably mounted in brackets 96 and 97 which are suspended from the lower side of member 12. The wheel 94 is made of any suitable non-conductive material and has disposed in the periphery thereof parallel to its longitudinal axis, a metallic bar 99 which is adapted to make contact between brush 93 and its adjacent brush 100 as the wheel 94 rotates. Brushes 93 and 100 are secured to non-conductive bars 101 and 102 respectively, which bars are in turn secured to supports 103 and 104 and these supports are suspended from the lower side of member 12.

Shaft 95 and its associated parts are rotated constantly since the shaft 95 has a grooved pulley 110 on the end thereof with a belt 111 mounted thereon for driving the same. The belt 111 is mounted on constantly driven pulley 21 mounted on shaft 17.

Leading from brush 102 is a wire 113 which wire has the other end thereof connected to a suitable battery 114. Leading from the other side of said battery is a wire 115 which has its other end connected to brush 82 to complete the circuit.

By referring to Figure 8 it is evident that when the brushes 81 and 82 are not contacting bar 80 that a circuit cannot be closed even though the bar 99 makes a circuit between brushes 93 and 102 each time shaft 95 rotates; however, when bar 80 is disposed on the lower side of the wheel 79 a circuit is made between brushes 81 and 82, and then the circuit is completed intermittently, that is, each time shaft 95 makes a revolution. In the present apparatus the wheel 79 remains in the position shown in Figures 3 and 8 approximately one-half of the time, and the other half of the time, the bar 80 is disposed on the lower side of the cylinder and connects the brushes 81 and 82. It is during the time that the bar is on the lower side of the wheel that the recording means is actuated by the completion of the circuit between brushes 93 and 102.

Extending from one end of member 12 is bracket 120 (Fig. 3), in which is pivoted as at 121 a lever 122. This lever 122 has secured in one end thereof a marking mechanism 123 which is adapted to contain a sufficient amount of ink or other fluid, for making a mark or dot each time the same is actuated over an appreciable length of time. The other end of lever 122 is of soft iron and is disposed opposite one end of magnet 91 so that each time the shaft 95 rotates and causes the circuit to be closed between brushes 93 and 102, the end of lever 122 is drawn into contact with magnet 91. Of course this is based upon the assumption that a circuit is also completed between brushes 81 and 82 by means of bar 80. When the magnet 91 draws the end of lever 122 into contact therewith it is evident that the end of the marking means will be drawn into contact with tape 125 which is being constantly unwound from tape roll 126, said tape roll being rotatably mounted on bracket 127.

Compression spring 124 is placed around stop pin 124a. This pin 124a limits the counter-clockwise rotation of lever 122 and the spring 124 restores the lever to normal position when the contact between brushes 93 and 102 is broken.

The tape is drawn downwardly over an arcuate plate 128 by means of rollers 129 and 130, said rollers being rotatably mounted in brackets 132 (Fig. 2). Roller 129 has a shaft 133 extending therefrom (Fig. 7) on the end of which is fixedly secured a grooved pulley 134. The pulley has a belt 135 mounted thereon which belt is also mounted upon a smaller grooved pulley 136 which is fixedly secured on the end of constantly driven shaft 95. It is therefore, seen that the rollers 129 and 139 will slowly draw the tape 125 downwardly over plate 128 and each time magnet 91 is energized the marking means 123 will engage the tape 125 and record a dot on the tape 125.

The number of dots which are recorded upon this tape during the descent of the ball 66 within the tube 65, will indicate the viscosity count of the substance which is being tested. This tape is preferably graduated into minutes and seconds and is driven so a section representing a minute will pass by the marker in exactly one minute, so the number of dots within a minute space will represent the viscosity of the fluid.

Figures 9 to 23 inclusive, show a modified form of the invention in which the viscosity count is indicated on a dial instead of being registered on a tape. This form also has means controlled by the indicator for regulating the viscosity of the substance so that the viscosity will be maintained within certain definite predetermined ranges. In this form a base member 140 is provided which has members such as 141 extending upwardly therefrom, to which is pivoted as at 142 a test chamber 143. The test chamber 143 comprises cover plate 145, annular member 146 and another cover plate 147, all of which are bolted together by suitable means such as bolts 148 penetrating all three of said members. The substance to be tested is forced into the inside of the chamber 143 through pipe 150. The point of entrance of this pipe 150 into the chamber also serves as the pivot point about which the test chamber is adapted to be adjusted. Secured near the upper portion of the test chamber 143 are plates 152 to which are pivoted as at 153, a pair of links 154, said links extending downwardly and being adjustably secured to the base member 140 by any suitable means such as bolts 155, which penetrate suitable spaced holes 156 in the links 154. The angle of adjustment of the test chamber is determined by the viscosity of the material being tested. For high viscosity the chamber would be swung to the right in Figure 10, and for substances having low viscosity the chamber would be swung to the left.

As has been previously stated, the material to be tested flows into the chamber 143 at the inlet 142 as shown in Figures 11 and 13, and completely fills the chamber. This same material escapes from the chamber through pipe 160 to which a flexible hose 161 is connected. The internal mechanism for testing the viscosity of the substance while flowing through the chamber, is similar in many respects to the mechanism shown in Figures 1 to 8 inclusive; however, in this case, it will be noted that the means for releasing the ball upon rotation of the testing tube is slightly different.

The cover plate 147 has rotatably mounted therein a shaft 162, which shaft has a pulley 163 fixedly mounted on one end thereof which is constantly driven to impart rotation to the shaft and a double finger member 164 having oppositely extending arms is fixedly secured on the other end thereof, and being disposed within the chamber 143. This finger member 164 has outstanding projections 165 and 166 integral therewith which are adapted to traverse slots 167 and 168 in the testing tube 169. The testing tube 169 has a ball 170 loosely mounted therein which is adapted to be engaged by the projections 165 and 166 after it has descended to its lowermost position in the tube. Then the tube and the ball will be turned one-half revolution. The testing tube 169 is fixedly secured to shaft 171, which is rotatably mounted in cover plate 145. This shaft has fixedly secured thereon a supporting bracket 172 which bracket has rotatably mounted in the ends thereof rollers 173 and 174 (Figs. 9 and 12). These rollers are normally contacted at all times by the lower side of a lever 175 which is pivoted as at 176 to a plate 177, said plate, in turn, being secured to cover plate 145. A tension spring 178 normally presses the free end of lever 175 against the upper peripheries of rollers 173 and 174 to hold shaft 171 and the test tube 169 in the position shown in Figure 13.

The ball 170, when in its lowermost position, rests against the interior surface of annular ring 146. When this is the case the center of the ball 170 is slightly below the center line of slot 167 or 168, depending upon which slot is in the lowermost position. It is quite evident that when member 164 rotates, one of the projections 165 or 166 will contact the ball slightly above its center thereby preventing the ball from moving upwardly within the test tube 169; (Fig. 15), consequently, the ball will slide against the inner periphery of ring 146 and carry along with it the test tube 169 until the test tube has been rotated approximately 180 degrees. At the time the ball 170 will ride upon a cam plate 180 which has its ends secured on the interior of ring 146, (Figs. 13 and 14), and this plate will force the ball 170 downwardly in the tube so that the projection 165 or 166 will not contact the same, when the finger overtakes the testing tube. The testing tube, shortly after passing horizontal position, jumps ahead of the constantly moving finger under the influence of spring 178 and therefore, ball 170 will be started on its travel by cam 180 before finger point 165 or 166 reaches the slot 167 or 168. If the ball should, for any reason, not start its travel, then cam 180 would have moved it far enough for the prong on the finger to engage the ball above its dead center and start it on its travel.

By providing an arrangement of this type it is possible to have the shafts 162 and 171 concentrically mounted relative to the center of chamber 143; whereas, in the form shown in Figures 1 to 8 inclusive, it was necessary to off-set these centers to allow the ball to be released at the proper time. The ball has somewhat of a piston action in its descent and forces practically all of the liquid from the tube, allowing another sample to enter from the other end. In this case, as in the form shown in Figures 1 to 8 inclusive, the viscosity counts will begin immediately upon the test tube coming to rest and the count will continue until the ball has reached the lowermost position at which time it will be engaged by one of the prongs 165 or 166 to cause the test tube to be rotated 180 degrees thereby closing the counting period. During the next descent of the ball the viscosity reading will not be taken as it is necessary to use every other descent for adjusting and restoring the various parts in the mechanism to their proper position.

Although the ends of plate 180 are secured to the interior periphery of the ring 146, the central portions are not secured and this portion is contacted by the end of a set screw 181 which can be screwed inwardly to cause the plate to occupy either a closer or a more remote position with relation to the ends of the test tube 169.

In order to provide an oil-tight joint between the shaft 162 and the cap plate 147 a compression spring 185 is placed around shaft 162 between the cover plate 147 and the pulley 163, (Fig. 9).

The shaft 171 has a restricted shaft 186 integral therewith which projects outwardly and is rotatably mounted in disk 187. The disk 187 is made of any suitable insulating material and is supported by a strap 189 which, in turn, is secured to the cover plate 145 by means of supports 190 and 191. In order to provide an oil-tight joint between the shafts 171 and plate 145 a compression spring 195 is disposed on the outer end of the restricted shaft 186 with one end thereof resting against strap 189, (Figs. 9 and 14). The other end is adapted to rest against a washer 196 to normally force the shafts 186 and 171 longitudinally of their axes and away from the plate 145 to cause the enlarged hub portion of the shaft 171 to fit tightly against the interior surface of plate 145.

The position of the testing tube 169, when at rest, is essentially that shown in Figure 13, or in a position rotated 180 degrees therefrom. The rollers 173 and 174 along with bar 175 normally maintain this test tube in its position while the testing is taking place. If it is desired to clean out the test tube and remove the ball therefrom, it is only necessary to remove a plug 200 from the annular member 146 and remove the ball in order that a suitable instrument may be inserted within the tube to clean the same. Also, suitable plugs, such as 201 are located in the side of test chamber 143 which may be removed in order to gain access to the interior of the chamber.

In actual operation, it should be noted that shaft 162 is constantly rotating whereas, the shaft 171 only rotates at intervals that is, when projection 165 or 166 engages the ball 170 and when this is done the shaft is rotated only 180 degrees until the ball is released.

Therefore, it is necessary to provide on this shaft a suitable drum such as 205 with various contacts thereon for controlling the recording and indicating means. This drum is made of a suitable insulating material and has a metallic ring 206, (Fig. 22), disposed along the entire circumference thereof near one edge of the drum. Upon this ring, a suitable brush 207 is adapted to rest at all times which is connected to a suitable supply of current from an outside source. Adjacent this ring is a short metallic band which extends around a very short portion of the circumference of the drum, and this is indicated by reference character 209. A brush 210 is adapted to contact this band at certain intervals to operate the counting or recording mechanism to cause the counts to be recorded after the descent of the ball has been made.

Disposed adjacent member 209 is a still shorter segmental band 212 in the periphery of member 205. When this segment is in the position shown in Figures 9 and 22, a brush 213 is adapted to normally contact it and operate the clutch mechanism to cause the clutch to be engaged. When the cylinder 205 has been rotated 180 degrees from the position shown in Figures 9 and 22, a brush 214 is adapted to contact the segment 212 which will operate the restoring mechanism to cause the counting mechanism to be returned to its initial position to begin a new count when the ball 170 starts its descent. The clutch is automatically released when segment 212 moves from beneath brush 213. The clutch mechanism, the recording mechanism and the restoring mechanism will be later described and their relation to the segment on drum 205 will be pointed out.

A belt 217 which is made of any elastic material, but preferably of a coil wire spring, is mounted upon pulley 163, (Figs. 9 and 10), and also upon another pulley 218, which pulley is fixedly secured upon stud shaft 219. The stud shaft 219 is located upon the same center as the pivot point of the chamber 143, and is secured to one side of the bracket 141 which is disposed on the near side of plate 147, (Fig. 10). Another pulley 220 is secured upon shaft 219 which has a belt 221 mounted thereon. This belt is also mounted upon another pulley 222 which is fixedly secured upon shaft 223. Shaft 223 is rotatably mounted in bearings 224 and 225, (Figs. 9 and 11), which bearings are mounted on top of base plate 226. Fixedly secured intermediate the bearings 224 and 225 on shaft 223 is a gear 230 which is adapted to mesh with a worm 231 on motor shaft 232. The end of motor shaft 232 is rotatably mounted in down-turned portion 235 of plate 236. This shaft extends to motor 237 and is driven thereby. It is thus seen that the rotation of the motor will drive shaft 162 and finger member 164 at a constant speed.

The indicating mechanism is operated by motor 237 simultaneously with the operation of the testing mechanism which has been described. The driving means for the indicating system comprises a worm 240 fixedly secured on the end of shaft 223. This worm meshes with gear 241 which is fixedly secured on vertically disposed shaft 242, said shaft 242 having its lower end rotatably mounted in base plate 226 and its upper end extending upwardly through various pinions and ratchets, (Fig. 21).

The plate 236 is supported by suitable columns 244 and disposed on top of plate 236 are other columns 245 which support another plate 246 thereabove.

The shaft 242 has fixedly secured thereto a T-shaped member 247 which has upwardly projecting pins 248 disposed therein on each side of the shaft, (Fig. 21). These pins are adapted to slidably penetrate holes in the lower horizontally disposed portion 252 of an I-shaped member 250 which is rotatably and slidably mounted on shaft 242. Member 250 has integral with the upper portion thereof an L-shaped member 251 which member is adapted to engage the teeth in ratchet 268 when it is desired to connect the indicating means with the driving means. In order to raise or lower the member 250 a suitable peripheral groove has been cut around the intermediate portion thereof in which the forked end of a member 255 is adapted to fit, (Fig. 20). The member 255 is pivoted as at 256 in bracket 257 which bracket extends upwardly from plate 236. The other end of member 255 has a link 260 connected thereto which extends downwardly and is connected to an armature 261 of solenoid 262. In order to normally limit the downward movement of counter-clockwise rotation of lever 255 in Figure 11, a pin 263 has been provided, and a compression spring 264 has been placed around this pin to normally rotate the lever 255 in a clockwise direction in Figure 11, and thereby force the clutch into a disengaged position when solenoid 262 is not energized.

The solenoid 262 has a wire 266 leading therefrom, the other end of this wire being connected to brush 213. When the drum 205 is in the position shown in Figures 9 and 22, the ball 170 is descending from its uppermost position within the tube 169 during which time the brush 213 is contacting the metallic segment 212 to furnish current to the solenoid 262. Since this solenoid will be energized the armature 261 will be pulled downwardly thereby rotating lever 255 in a counter-clockwise manner in Figure 11, to cause the L-shaped member 251 to move upwardly and engage ratchet member 268. Ratchet member 268 is integral with a hub member 269, said hub member having integral with the upper portion thereof another ratchet 270. (Figs. 11, 18 and 19.)

The ratchet 270 has a pin 271 extending upwardly from the upper surface thereof which is adapted to be forced against a hooked stop member 272, when the parts are restored to normal position.

In order to pull the members 268 and 270 backwardly to the position where the pin 271 will engage the stop member 272 a suitable cord 275 has been wound around the hub portion 269 with one end thereof secured to said hub portion and its other end wound around and secured to a spool 276. (See Figs. 11, 18 and 19.) The spool 276 is loosely mounted around pin 277 which projects upwardly from plate 236. This pin has a washer 278 fixedly secured thereto, to which one end of a torsion spring 279 is secured, said torsion spring being placed around the intermediate portion of pin 277 and having its other end secured to the lower surface of spool 276. The stop member 272 is mounted on top of pin 273 which projects upwardly from plate 236.

The ratchet 270 is adapted to be normally engaged by a dog 290, (Figs. 10 and 18), said dog being pivotally mounted around pin 291 which is disposed between plates 246 and 236. A tension spring 292 normally holds the dog 290 into engagement with ratchet 270 and prevents any reverse rotation of the ratchet due to the constant pull exerted by spool 276. The dog 290 also has secured thereto a link or cord 294 which is also secured to the upper end of bell crank lever 295. The lever 295 is mounted for oscillation on pin 296, which in turn, is secured in the vertical upstanding legs of brackets 297. The horizontal leg of lever 295 has a cord 298 secured thereto which extends downwardly and is connected to the upper end of an armature 299, (Figs. 9, 10, 18 and 22). This armature is actuated by solenoid 300 which, when energized, will pull the armature 299 downwardly and cause the free end of dog 290 to be pulled outwardly from engagement with the ratchet 270 and thereby allow the tension produced by spool 276 to cause the ratchet to rotate until pin 271 engages stop 272.

The solenoid 300 has wire 305 leading therefrom which is connected to brush 214. It is evident by observing Figures 9 and 22, that current is not supplied to brush 214 until the metallic member 212 is disposed upon the lower side of the drum 205 at which time the viscosity is not being tested, although the ball is descending, but instead, the parts are being returned to normal position in order that another count may be made after the shaft 171 and testing tube 169 have been rotated an additional 180 degrees to cause the metallic portion 212 to assume the position shown in the drawings. When the current is supplied to solenoid 300 through brush 214 the ratchet 270 is restored to its initial position so that another viscosity count can be started.

Rotatably mounted on the upper end of shaft 242 is another hub member 307 having a ratchet member 308 integral with the lower portion thereof. (Figs. 10, 11, and 17). A cord 309 has one end thereof secured to the hub member 307 and wrapped therearound, and has its other end wrapped around spool member 310 and secured thereto. The purpose of this cord is to normally exert a tension upon the hub member 307 to cause it to tend to rotate in a counter-clockwise manner in Figure 17. The construction of spool 310 and its associated parts is identical in all respects to the construction of the spool 276. The spool 310 is loosely mounted on the upper end of pin 311 extending upwardly from plate 236. A washer 312 is fixedly secured to the pin 311 and a torsion spring 318 is mounted around the pin 311 and disposed between the washer 312 and the spool 310 with the ends of the torsion spring being secured to the washer and spool respectively. A dog 315 normally engages the teeth in ratchet member 308 to hold the same in the position in which it might be placed. This dog is pivotally mounted around pin 291, and a tension spring 317 normally holds the dog 315 in engagement with the ratchet.

Projecting below the lower side of ratchet 308 is a pin 319 which travels on the same radius with respect to shaft 242 as the pin 271 which is disposed therebelow in plate 270. When the viscosity count is started the clutch is connected and immediately thereafter the ratchet 270 starts to turn in a clockwise manner in Figure 18. The pin 271 in this ratchet then engages the downwardly extending pin 319 in ratchet 308 which will cause pinion 308 to rotate along with the pinion 270 until the viscosity count has been completed. Since the upper end of the hub 307 has secured thereon an indicator 320 it is evident that the pin 271 during its rotation, will rotate the pin 319 and the ratchet 308 around the upper end of shaft 242 to cause the indicating hand 320 to be rotated to the proper position relative to the dial 321.

If, for any reason, the viscosity upon a second or successive count, is not equal to the viscosity of the preceding count then the pin 271 will not be rotated far enough to engage the pin 319; therefore, at the end of the count, the hand will not have been actuated by the movement of ratchet 270. Therefore, it is necessary that means be provided upon the completion of the count for causing the ratchet 308 and the indicator 320 to move backwardly far enough so that pin 319 will contact the pin 271 in order that the actual viscosity count will be indicated by the hand 320 on dial 321. It is necessary for this backward movement of the upper ratchet 308 to take place prior to the release of the lower ratchet 270, that is, prior to the time when this lower ratchet is returned to normal position. Therefore, immediately after the viscosity count has been completed and the ratchet 270 has ceased rotation, the dog 315 (Fig. 17) is released to allow the stored up energy in the spool 310 to rotate the ratchet 308 in a counter-clockwise manner until the pin 319 engages the pin 271.

It is quite evident that if there has been no decrease in the viscosity count from that of the preceding count, the pin 319, at the time of the release of ratchet 290 be in contact with the pin 271, consequently, there will be no reverse movement, but if there has been any decrease, the amount of decrease will be the amount of reverse rotation which will take place when the dog 315 is released.

Dog 315 has connected to the free end thereof a cord 325 which cord has its other end connected to the vertical leg of bell crank 326, said bell crank being mounted for oscillation around shaft 296. Secured to the end of horizontal leg of bell crank 326 is another cord 327 (Figs. 10 and 12), which is connected to an armature 328. This armature is adapted to be operated by solenoid 329 when it is desired to release ratchet 315 to allow it to rotate until pin 319 engages pin 271 and cause the exact count to be registered by dial hand or indicating means 320.

A wire 330 leads from solenoid 329 and is connected to brush 210, which brush is adapted to be contacted by metallic portion 209 when the cylinder 205 travels from its position shown in the drawings to a position 180 degrees therefrom. This means that the current furnished to the solenoid 329 is for only a very short period which will allow dog 315 to be disengaged from ratchet 308 long enough to allow the pin 319 to engage the pin 271 in the ratchet therebelow, and then dog 315 will again resume its engagement to prevent any further reverse rotation.

The current is furnished to brush 207 through wire 323 and the circuit is completed by means of ground wire 324 which is connected to the other side of solenoids 262, 300 and 329. This is an A. C. circuit.

*Method of operation*

Briefly, the operation of the invention is as follows: The testing tube 169 is moved to the position shown in Figure 13 by means of member 164 at which time the ball 170 starts its downward descent. In this position, the brush 213 is contacting metallic member 212 and the current is then furnished to the solenoid 262 for causing the clutch mechanism 251 to be engaged. Hence, the motor 237 will be rotating the ratchets 268 and 270 in a clockwise manner as well as the clutch mechanism 251, (Figs. 17 and 18). This rotation continues until the ball 170 has reached the lower end of tube 169 at which time a prong 165 or 166 will engage the ball and cause the shaft 171 to be rotated 180 degrees. If, in the rotation of the members 268 and 270, the viscosity count for any time is not as great as the viscosity count of the preceding time, then the pin 271 will not contact the pin 319 in ratchet 308; therefore, in order to cause the hand 320 secured on top of hub member 307 to move backwardly and record the proper reading, the solenoid 329 is energized as the metallic portion 209 contacts brush 210, thereby releasing the ratchet 308 and allowing it to move in a counter-clockwise manner until it engages the pin 271, (Figs. 17 and 18). At the time this pin 319 moves backwardly and engages the pin 271, the dog 290 is not disengaged but is still holding the ratchet 270. Immediately after ratchet 308 has been returned to the proper position to cause the reading to be properly shown upon dial 321, the dog 315 again engages ratchet 308 and then the dog 290 is released as the metallic portion 212 moves beneath the brush 214 to cause the solenoid 300 to be energized. When this is done, spool 276 will return the ratchet 270 to the position shown in Figure 18, leaving the upper ratchet 308 in its proper position with the reading shown on the dial.

It is very often desired to control the viscosity of a substance which is being fed through the apparatus within certain ranges. I have, therefore, provided a pair of segmental arcs 331 and 332 (Figs. 21 and 23), and have adjustably mounted them on the inside of the dial 321. These arcs are secured to suitable arms 333 and 334 respectively, which arms are made of any suitable insulating material, and when the arcs have been adjusted to the proper position they are fixed in this position by means of set screws 334a.

By referring to Figures 10, 11 and 21, it is seen that these arcuate members 331 and 332 are beveled at each end and the high portions thereof are disposed slightly above the top of the dial 321. The free end of indicator 320 is disposed slightly below the top of these arcuate members so that when the viscosity of the substance indicates too much or too little, the end of this hand will ride upon arcuate members 331 and 332 to complete a circuit and hence, start certain mechanisms into operation to increase or decrease the viscosity of the substance.

It is evident that a similar arrangement could be made for increasing or decreasing the pressure but only one form is shown to illustrate the practicability of the apparatus.

Let us assume that the apparatus as shown is applied to a schematic hook-up, (Fig. 23), in which a suitable pump 335 is placed in the feed line for forcing a suitable fluid from source 336 through the testing apparatus 143. This supply may be continuously supplied with fluid through pipe 336a which has approximately the desired viscosity.

Furthermore, let us assume that the supply 336 is of a suitable oil, or other substance such as sizing in a slasher of which it is desired to maintain a relatively constant viscosity. In order to accomplish this end, a suitable tank 337 has been provided having a thick substance and a tank 338 has been provided having a thinner substance than the substance in the supply tank 336. The tank 337 has a line 339 connecting this tank with the tank 336 and disposed in this line is a suitable pump 340 for forcing the liquid from tank 337 to tank 336. This pump is operated intermittently as occasion may justify by means of a motor 341. Likewise, a line 342 connects tank 338 with tank 336 and this line has a pump 343 installed therein which is operated by motor 344.

The motor 341 has a wire 350 leading from one side thereof which wire leads to one side of switch 352 and from the other side of switch 352 is a wire 353 which furnishes the current to said motor. Leading from the other side of motor 341 is ground wire 355. Likewise, motor 344 has wire 357 leading therefrom which leads to one side of switch 358 and from the other side of switch 358 is wire 359 through which the current is introduced to motor 344. This motor is also grounded by wire 355. Wires 353 and 355 are connected to a suitable source of electrical energy, not shown, which may be a battery, but is preferably a source of alternating current.

The switch 352 is operated by a solenoid 360 and a spring 361 normally tends to hold the switch in an opened position when the solenoid 360 is not energized. Leading from one side of solenoid 360 is a wire 362 which is connected to a battery 363, said battery being grounded as at 364. Leading from the other side of the solenoid 360 is wire 366 which has its other end connected to arcuate member 332.

It is evident that if the viscosity is less than what is desired, the indicating means 320 will not move off of the arcuate segment 332, hence the circuit will be grounded and current will be allowed to flow from the battery 363 through the solenoid 360, wire 366, arcuate segment 332 and through the indicator 320 to ground 367. When this is done the switch 352 will be closed and current will be furnished to motor 341 to cause the pump 340 to pump thick oil from the tank 337 to supply tank 336. In succeeding counts, if the viscosity proves to be satisfactory, the hand 320 will move in a zone between the segments 331 and 332.

Likewise, a solenoid 370 controls the switch 358 and has a compression spring 371 for normally holding the switch in open position when the solenoid is not energized. A wire 372 connects solenoid 370 with the battery 363 and another wire 373 connects the solenoid with the arcuate member 331. If the viscosity is too great, then the indicator 320 will ride upon the arcuate member 331 to cause the switch 358 to be closed which, in turn, will start the motor 344. This will cause thin liquid to be pumped from tank 338 to the supply tank 336.

As has been stated, this is merely one illustration showing how the mechanism could operate. It is quite evident that viscosity could be regulated from the same apparatus by governing the pressure as in the case of the manufacture of rayon. Where it is not desired to change the viscosity of the liquid, that is being fed, but where a constant amount of liquid is desired to be fed regardless of its viscosity, then the pressure is varied by a mechanism of this type. This is especially applicable in case of feeding oil to steam boilers.

In the above-described mechanism shown in Figure 23, the viscosity is kept constant and the indicating means is used for maintaining this constant viscosity.

I have shown the entire supply of the liquids being fed through the testing apparatus. It is evident, that in handling large volumes of oil, for example, a small portion of the flow of oil could be diverted through this testing apparatus which would continuously keep a check on the viscosity of the entire body of oil.

The viscosity testing means can be adapted to control any desired work-performing instrumentalities. For example, in Figure 23, pipe 339 could have a heating coil controlled by solenoid 360, and pipe 342 could have a cooling coil controlled by solenoid 370, which would supply a hot or cold liquid to the testing means automatically when the viscosity changed in the liquid passing through the testing means.

In the case where tests as to viscosity were desired to be employed for regulating the pressure under which the substance was flowing as in spinning rayon through a spinnaret, I could have a compressor of greater capacity than required, and solenoid could vent at one rate from the compressed air tank and the solenoid could control a valve to vent as a greater rate than the first named valve. This would cause the viscosity of the material to automatically control the pressure under which it was being processed. Or, 341 and 344 could be compressors of different capacities which would be selectively operated as a result of the tests made periodically and they would furnish the desired pounds pressure on the material being processed.

In the case of a sizing or slashing machine, solenoid 360 could control a valve to an open steam coil and solenoid 370 could control a valve to a closed steam coil, both coils being in the sizing vat. This would automatically control the viscosity of the sizing solution.

In the case of feeding crude oil to an oil burner, solenoid 360 could control a heater of one capacity in the oil and solenoid 370 could control a heating coil of greater capacity than the first heating coil. Therefore, the tests made periodically would place one or the other of these coils in operation to maintain the crude oil at the proper temperature and therefore at the proper viscosity.

The above are a few of the uses to which my apparatus may be placed. It is therefore, quite evident that the invention embraces means for testing the viscosity of a substance and means controlled by the testing means for controlling and/or operating any desired work performing instrumentality or instrumentalities.

In the drawings and specification there has been set forth a preferred embodiment of the invention, and although specific terms are employed, they are used in a generic and descriptive sense only, and not for purposes of limitation, the scope of the invention being set forth in the appended claims.

I claim:

1. Apparatus for continuously testing the viscosity of liquid comprising a casing, means for forcing a liquid continuously through said casing, a hollow tube mounted in said casing for rotation, said tube having a ball slidably confined therein, means partially closing the ends of the tube, said tube having its sidewalls slotted near its ends, a member mounted for rotation in said casing and having prongs thereon adapted to pass through said slots, means for arresting the rotation of said tube when it has been moved approximately 180 degrees and holding it at an angle inclined to the horizontal, an electrical circuit, and means controlled by the position of said tube while at rest for completing said circuit, and means controlled by said circuit for indicating the viscosity of the liquid passing through said casing.

2. Apparatus for testing a fluid as to viscosity comprising a closed casing, means for forcing a fluid continuously through said casing under pressure, means disposed within the casing for periodically taking a viscosity count of the fluid passing through the casing, a movable indicator finger, constantly moving means, means for connecting the movable indicator to the constantly moving means during a viscosity count, means for automatically disconnecting the constantly movable means from the movable means upon termination of a viscosity count.

3. Apparatus for testing a fluid as to viscosity comprising a closed casing, means for forcing a fluid continuously through said casing under pressure, means disposed within the casing for periodically taking a viscosity count of the fluid passing through the casing, a movable indicator finger, constantly moving means, means for connecting the movable indicator to the constantly moving means during a viscosity count, means for automatically disconnecting the constantly movable means from the movable means upon termination of a viscosity count, and means for holding the movable indicator in the position to which it has been moved during a viscosity count, and means operable during the next succeeding viscosity count for allowing reverse movement of the finger if the next succeeding viscosity count is not as great as the preceding viscosity count to cause the indicator to show the lower viscosity count.

4. Apparatus for testing the viscosity of a liquid comprising a closed casing having intake and exhaust ports, means for passing a liquid through said casing under pressure, means disposed within the casing and completely immersed in the liquid at all times for periodically testing the viscosity of the liquid flowing through said casing, an indicator movable in proportion to the viscosity count, means for holding the indicator in position where it has been moved during a previous count until the next succeeding viscosity count is taken, and means for allowing reverse movement of the indicator in the event a succeeding viscosity count is not as great as the previous count.

JOHN M. BELL.